(12) United States Patent
Al Jadda et al.

(10) Patent No.: US 10,956,870 B2
(45) Date of Patent: Mar. 23, 2021

(54) DISTRIBUTION OF CANDIDATE INFORMATION TO A RECRUITER LIST

(71) Applicant: CareerBuilder, LLC., Chicago, IL (US)

(72) Inventors: Khalifeh Al Jadda, Norcross, GA (US); Abdel Tefridj, Norcross, GA (US); Mohammed Korayem, Norcross, GA (US); Brittany Dunn, Norcross, GA (US)

(73) Assignee: CareerBuilder, LLC, Chicago, IL (US)

( * ) Notice: Subject to any disclaimer, the term of this patent is extended or adjusted under 35 U.S.C. 154(b) by 289 days.

(21) Appl. No.: 15/394,389

(22) Filed: Dec. 29, 2016

(65) Prior Publication Data

US 2018/0189740 A1    Jul. 5, 2018

(51) Int. Cl.
*G06Q 10/10* (2012.01)
*G06Q 30/02* (2012.01)

(52) U.S. Cl.
CPC ..... *G06Q 10/1053* (2013.01); *G06Q 30/0275* (2013.01)

(58) Field of Classification Search
CPC ............. G06Q 10/105; G06Q 10/1053; G06Q 10/063112; G06Q 30/0275
USPC .................................................. 705/320, 321
See application file for complete search history.

(56) References Cited

U.S. PATENT DOCUMENTS

| | | | | |
|---|---|---|---|---|
| 2006/0265268 A1* | 11/2006 | Hyder | ............ | G06O 10/06311 705/321 |
| 2007/0136310 A1* | 6/2007 | Derrico | ................. | G06Q 10/06 |
| 2008/0208651 A1* | 8/2008 | Johnston | .......... | G06Q 10/06311 705/7.13 |
| 2009/0138378 A1* | 5/2009 | Suba | .................. | G06Q 30/0601 705/26.1 |
| 2009/0198558 A1* | 8/2009 | Chen | .................. | G06Q 10/1053 705/321 |
| 2009/0327013 A1* | 12/2009 | McGovern | ............. | G06Q 10/10 705/321 |
| 2012/0030286 A1* | 2/2012 | Tiu, Jr. | ..................... | H04L 51/32 709/204 |
| 2012/0197835 A1* | 8/2012 | Costa | ................. | G06Q 10/1053 706/52 |
| 2014/0046756 A1* | 2/2014 | Wang | ................. | G06O 30/0251 705/14.45 |

(Continued)

*Primary Examiner* — Tamara Griffin
(74) *Attorney, Agent, or Firm* — Neal, Gerber & Eisenberg LLP

(57) ABSTRACT

Method and systems are disclosed for distribution of candidate information to a recruiter list. An example apparatus includes a candidate manager to retrieve, via a processor, a first keyword provided by a candidate during a session of the candidate on an employment website. The apparatus includes a recruiter-candidate comparator to query, in real time during the session, a database including bids for candidates. The recruiter-candidate comparator is to retrieve, in response to identifying that at least one of the bids for candidates includes the first keyword, one or more of the bids for candidates from the database that include the first keyword and determine a recruiter list to include at least one recruiter of the one or more bids for candidates that include the first keyword. The apparatus includes a recruiter manager to distribute, in real time during the session, candidate information of the candidate to the recruiter list.

20 Claims, 5 Drawing Sheets

(56) References Cited

U.S. PATENT DOCUMENTS

| | | | | |
|---|---|---|---|---|
| 2014/0136338 A1* | 5/2014 | Ringdahl | ........... | G06Q 30/0275 705/14.71 |
| 2014/0297547 A1* | 10/2014 | Kruglick | ................ | G06Q 10/00 705/319 |
| 2016/0034854 A1* | 2/2016 | Kamat | ............... | G06Q 10/1053 705/321 |
| 2016/0321693 A1* | 11/2016 | Dabbiru | ............. | G06Q 30/0256 |

* cited by examiner

DISTRIBUTION OF CANDIDATE INFORMATION TO A RECRUITER LIST

TECHNICAL FIELD

The present disclosure generally relates to recruiters and candidates and, more specifically, distribution of candidate information to a recruiter list.

BACKGROUND

Typically, employment websites (e.g., CareerBuilder.com®) are utilized by employers and job seekers. Oftentimes, an employment website incorporates a job board on which employers may post positions they are seeking to fill. In some instances, the job board enables an employer to include duties of a position and/or desired or required qualifications of job seekers for the position. Additionally, the employment website may enable a job seeker to search through positions posted on the job board. If the job seeker identifies a position of interest, the employment website may provide an application to the job seeker and/or enable the job seeker to submit a completed application and/or a resume to the employer.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for distribution of candidate information to a recruiter list. An example disclosed apparatus for distributing candidate information of a candidate for employment to a recruiter list includes a candidate manager to retrieve, via a processor, a first keyword provided by a candidate during a session of the candidate on an employment website. The example disclosed apparatus also includes a recruiter-candidate comparator to query, in real time during the session, a database including bids for candidates. Each of the bids for candidates includes a keyword and a recruiter. The recruiter-candidate comparator also is to retrieve, in response to identifying that at least one of the bids for candidates includes the first keyword, one or more of the bids for candidates from the database that include the first keyword and determine a recruiter list to include at least one recruiter of the one or more bids for candidates that include the first keyword. The example disclosed apparatus also includes a recruiter manager to distribute, in real time during the session of the candidate on the employment website, candidate information of the candidate to the recruiter list to facilitate communication with the candidate.

An example method disclosed herein for distributing candidate information of a candidate for employment to a recruiter list includes retrieving, via a processor, a first keyword provided by a candidate during a session of the candidate on an employment website and querying, in real time during the session, a database including bids for candidates. Each of the bids for candidates includes a keyword and a recruiter. The example disclosed method also includes retrieving, in response to identifying that at least one of the bids for candidates includes the first keyword, one or more of the bids for candidates from the database that include the first keyword. The example disclosed method also includes determining a recruiter list to include at least one recruiter of the one or more bids for candidates that include the first keyword and distributing, in real time during the session of the candidate on the employment website, candidate information of the candidate to the recruiter list to facilitate communication between the candidate and the at least one recruiter of the recruiter list.

An example disclosed tangible computer readable medium includes instructions which, when executed, cause a machine to retrieve, via a processor, a first keyword provided by a candidate during a session of the candidate on an employment website and query, in real time during the session, a database including bids for candidates. Each of the bids for candidates includes a keyword and a recruiter. The instructions, when executed, also cause the machine to retrieve, in response to identifying that at least one of the bids for candidates includes the first keyword, one or more of the bids for candidates from the database that include the first keyword. The instructions, when executed, also cause the machine to determine a recruiter list to include at least one recruiter of the one or more bids for candidates that include the first keyword and distribute, in real time during the session of the candidate on the employment website, candidate information of the candidate to the recruiter list to facilitate communication with the candidate.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
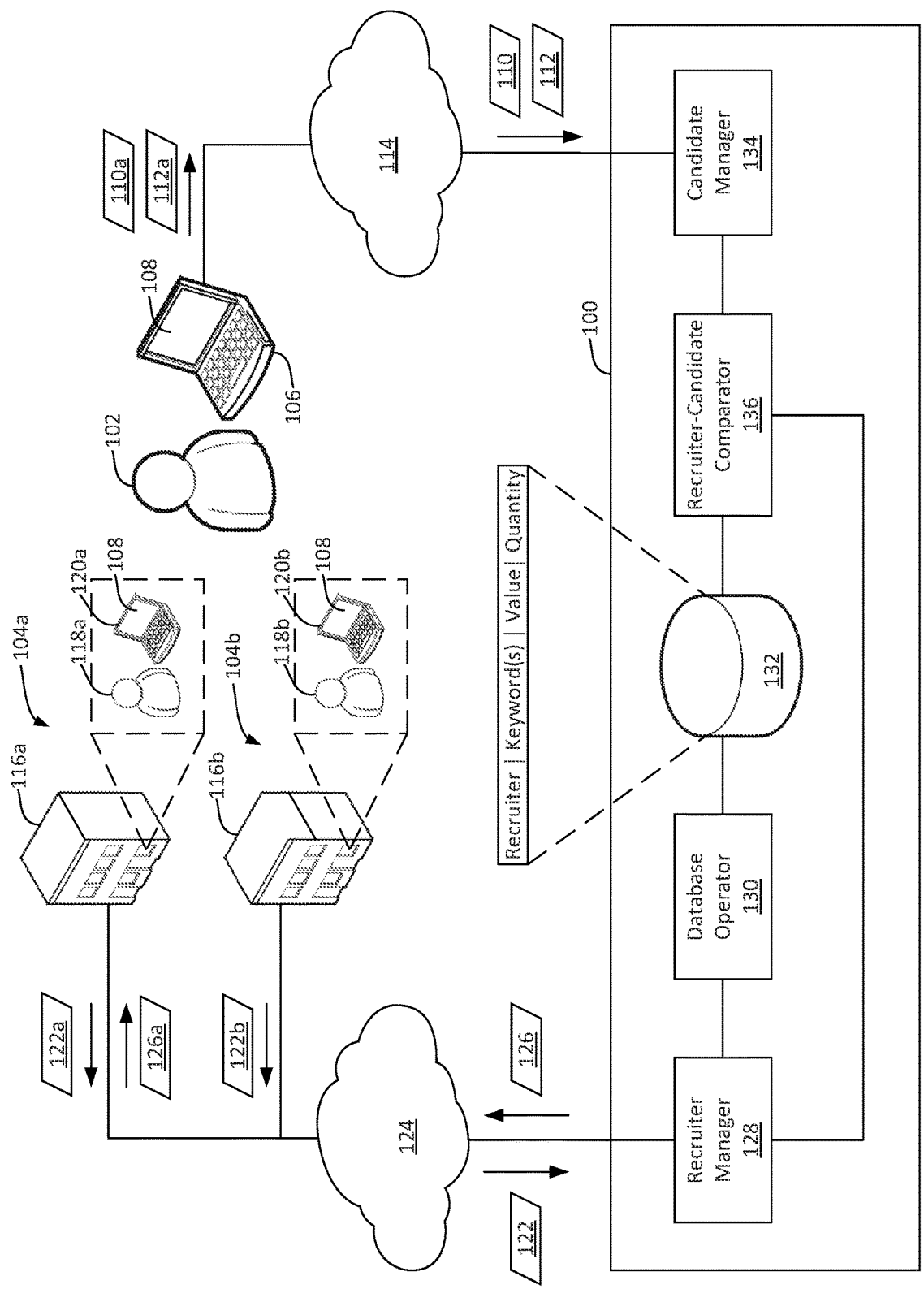
FIG. 1 illustrates an example employment website entity that is to distribute candidate information of a candidate to a recruiter list in accordance with the teachings herein.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Employment websites (CareerBuilder.com®) generally are utilized to facilitate employers in hiring job seekers for open positions. Oftentimes, an employment website incorporates a job board on which employers may post the open positions they are seeking to fill. In some instances, the job board enables an employer to include duties of the posted position and/or desired or required qualifications of job seekers for the posted position. Further, some employment websites enable a job seeker to search through positions posted on the job board. If the job seeker identifies a position of interest, the employment website may provide an application to the job seeker and/or enable the job seeker to submit a completed application, a resume, and/or a cover letter to the employer.

Some employment websites include tens of thousands of job seekers may be seeking employment in a particular region. Further, some job seekers may submit applications and/or resumes to positions for which they are unqualified (e.g., a retail cashier applying for a position as a CEO). Thus, an employer may be inundated with applications and/or resumes submitted by (qualified and unqualified) job seekers. As a result, employers potentially may find it difficult to identify job seekers qualified for their posted position. At the same time, a job board may include thousands of job postings for a particular region. As a result, it potentially may be difficult for a position posted by an employer to stand out on a job board. In such instances, job seekers that would be interested in and qualified for a position potentially may not view and, thus, may not apply for that position posted by an employer.

Other websites utilize online advertising systems in which advertisers bid to have their advertisements displayed to users of search engines. In such instances, an advertiser utilizing such online advertising systems may bid to have its advertisement displayed with search results for a particular term that relates to the service(s) and/or product(s) it provides. When the user enters the search term into the search engine, the online advertising system receives the search term, identifies a bid for an advertisement associated with the search term, and incorporates the advertisement of the bid into the search results that are presented to the user based on the search term. While such online advertising systems enable an advertiser to target its advertisements to online users interested in particular terms, such online advertising systems are reliant on the user viewing the advertisement and selecting the advertisement to receive additional information for services and/or products of the advertisers.

The example methods and apparatus disclosed herein include an employment website that collects bids for candidates provided by recruiters, collects keyword(s) provided by a candidate, and distributes candidate information of the candidate to a list of recruiters in real time during a session of the candidate on the employment website based on the bids for candidates of the recruiters and the keyword(s) provided by the candidate. Thus, the examples disclosed herein provide an unconventional technical solution of distributing candidate information of a candidate to recruiters while the candidate is on the employment website to a technological problem of facilitating communication between one or more recruiters with the candidate via the employment website. Further, the candidate information may be provided to the list of recruiters without receiving and displaying job postings of lists of recruiters to enable the list of recruiters to identify qualified candidates without being inundated with applications, resumes, and/or other information from unqualified candidates. The candidate information also may be provided to the list of recruiters without the candidate selecting and/or submitting information to the list of candidates to enable the list of recruiters to collect candidate information of qualified candidates that potentially may not view job postings of the list of recruiters.

Example disclosed herein include a candidate manager that retrieves a keyword (e.g., a first keyword) provided by a candidate during a session of the candidate on an employment website. As used herein, a "keyword" refers to a word, a term, and/or a phrase that is utilized to index and/or retrieve associated information and/or data. As used herein, a "candidate" refers to a person who is searching for a job, position, and/or career. As used herein, an "employment website" refers to a website and/or any other online service that facilitates job placement, career, and/or hiring searches. Example employment websites include CareerBuilder.com®, Sologig.com®, etc. As used herein, an "employment website entity" is an entity that operates and/or owns an employment website. As used herein, a "session" refers to an occurrence during which the candidate is on the employment website. For example, a session begins when the candidate opens and/or logs onto the employment website and ends when the candidate closes and/of logs off of the employment website.

Additionally, a recruiter-candidate comparator of the examples disclosed herein queries a database of bids (e.g., bids for candidates) in real time during the session. For example, each of the bids includes a keyword, a recruiter, and a bid value. As used herein, a "recruiter" refers to a person and/or entity (e.g., a company, a corporation, etc.) that solicits and/or hires one or more candidates for a position and/or a job. As used herein, "real time" refers to a time period that is simultaneous to and/or immediately after a candidate enters a keyword into an employment website. For example, real time includes a time duration before a session of the candidate on the employment website ends. Further, the recruiter-candidate comparator retrieves, in response to identifying that at least one of the bids for candidates includes the keyword, one or more of the bids of the database that includes the keyword provided by the candidate and determines a recruiter list to include at least one recruiter of the one or more bids that include the keyword of the candidate. Otherwise, in response to the recruiter-candidate comparator identifying that none of the bids for candidates includes the keyword, one or more recruiters are prompted (e.g., via a recruiter manager) to bid for the candidate based on the keyword in real time during the session of the candidate on the employment website.

In some examples, the candidate manager transforms the keyword provided by the candidate via the employment website to enable or facilitate the recruiter-candidate comparator in retrieving the one or more of the bids of the database that include the keyword. As used herein, to "transform" to "stem," and to "perform word normalization" refer to a process in which a word and/or one or more words of a phrase is changed to its word stem, root, or base. For example, transforming a keyword includes changing "performs," "performed," and/or "performing" to "perform." In some examples, the candidate manager identifies term(s) associated with the keyword, and the recruiter-candidate comparator retrieves one or more of the bids for candidates from the database that include at least one of the keyword and the term(s) associated with the keyword. In such examples, the keyword(s) are provided by the candidate to the candidate manager, and the associated term(s) are generated by the candidate manager based on the keyword(s) provided by the candidate.

Further, in some examples, a first recruiter is associated with a plurality of bids for candidates. At least one of the bids for candidates may be associated with the first recruiter includes multiple keywords. In such examples, each of the bids for candidates associated with the first recruiter includes a different keyword combination than the other of the bids for candidates associated with the first recruiter. Additionally or alternatively, the candidate manager retrieves a second keyword provided by the candidate during the session on the employment website. In some such examples, the recruiter-candidate comparator retrieves the one or more bids of the database that include the first keyword and the second keyword.

Example disclosed herein also include a recruiter manager that distributes candidate information of the candidate to the recruiter list. In some examples, the recruiter manager distributes the candidate information to the recruiter list without receiving a job posting for a job board of the employment website from the recruiter list and/or without the candidate selecting the recruiter list via the employment website. As used herein, "candidate information" refers to contact information and/or qualification information of a candidate. For example, candidate information includes a phone number, an email address, a street address, education, work experience, skills, occupation licenses, etc. As used herein, a "job posting" is a notification for a position that is submitted by a recruiter and presented to one or more candidates via a job board of the employment website. As used herein, a "job board" is an online forum or message board that includes job postings of recruiters and/or enables candidates to search the job postings and submit applications, resumes, and/or other information to the recruiters associated with job postings.

In some examples, the recruiter list includes a portion of the recruiters that correspond to the bid(s) including the keyword provided by the candidate. To determine the recruiter list, the recruiter-candidate comparator may compare the bid values of the bid(s) of the database that include the keyword. For example, the recruiter-candidate comparator includes the bid(s) that have the highest bid value(s) in the recruiter list. Additionally or alternatively, a number of recruiters included in the recruiter list is less than or equal to a predetermined threshold.

In some examples, the recruiter manager collects the bids from the recruiters via the employment website. Further, the recruiter manager may transform the keyword of each of bids provided by the recruiters via the employment website to enable or facilitate the recruiter-candidate comparator in retrieving the one or more of the bids of the database that include the keyword. Additionally, the recruiter manager may identify terms associated with the keywords of the bids for candidates and include those terms in the bids for candidates. In such examples, the keyword(s) of the bids for candidates are provided by recruiters to the recruiter manager, and the associated term(s) are generated by the recruiter manager based on the keyword(s) provided by the recruiters.

Turning to the figures, FIG. 1 illustrates an example employment website entity 100 in communication with recruiter(s) and candidate(s) in accordance with the teachings herein to facilitate recruiter(s) in hiring candidate(s) for positions. In the illustrated example, the employment website entity is in communication with a candidate 102 and recruiters 104a, 104b.

In the illustrated example, the candidate 102 utilizes a computer 106 (e.g., a laptop, a tablet, a desktop, a mobile device, etc.) to interact with an employment website 108 (e.g., CareerBuilder.com®, Sologig.com®, etc.) of the employment website entity 100 during a session on the employment website 108. For example, the candidate 102 receives information from the employment website entity 100 via the employment website 108. For example, the candidate 102 may view job postings on a job board, descriptions of employers, descriptions of and/or requirements for positions, etc. via the employment website 108.

Additionally, the candidate 102 submits candidate information 110a to the employment website entity 100 via the employment website 108. For example, the candidate information 110a of the candidate 102 includes a candidate profile of the candidate 102 and/or document(s) associated with the candidate 102 (e.g., a resume, a cover letter). The candidate profile may include contact information (e.g., a street address, an email address, a phone number, etc.), work experience information, education information, certificate and/or license information, salary information (e.g., current salary, desired salary, etc.), and/or other information related to the candidate 102.

The employment website 108 also enables the candidate 102 to search for positions, employers, and/or other information, for example, via a search engine and/or other search tool of the employment website 108. As illustrated in FIG. 1, the candidate 102 utilizes the computer 106 to submit, during the session, keyword information 112a to the employment website entity 100 via a search tool of the employment website 108. For example, the keyword information includes a first keyword, a second keyword, a third keyword, etc. The keyword(s) of the keyword information 112a relate to a region of interest (e.g., a city such as Chicago, a state such as Illinois, an area code such as 60606), an industry (e.g., oil and gas, automotive, food services, etc.), a career or position, (e.g., a sales executive, a teacher, a technician, a software engineer, etc.), and/or any other characteristic associated with job searches.

In the illustrated example, the candidate information 110a and the keyword information 112a of the candidate 102 is sent to a network 114 (e.g., via a wired and/or a wireless connection). While FIG. 1 illustrates the network 114 as receiving candidate information and/or keyword information from one candidate (e.g., the candidate information 110a and the keyword information 112a of the candidate 102), the network 114 may receive candidate information and/or keyword information from a plurality of candidates (e.g., a second candidate, a third candidate, etc.). Further, as illustrated in FIG. 1, the employment website entity 100 retrieves candidate information 110 and keyword information 112 from the network 114 (e.g., via a wired and/or wireless connection). For example, the candidate information 110 includes the candidate information 110a of the candidate 102 and/or candidate information of other candidates, and the keyword information 112 includes the keyword information 112a of the candidate 102 and/or keyword information of other candidates.

As illustrated in FIG. 1, the recruiter 104a includes a recruiter employer 116a and a recruiter employee 118a, and the recruiter 104b includes a recruiter employer 116b and a recruiter employee 118b. For example, the recruiter employers 116a, 116b are companies, corporations, and/or other entities that utilize the employment website 108 of the employment website entity 100 to hire a candidate (e.g., the candidate 102) for an open position. The recruiter employees 118a, 118b (e.g., a human resources representatives) interact with the employment website 108 via respective computers 120a, 120b to search for and hire candidates for the open positions of the recruiter employers 116a, 116b. The illustrated example includes two recruiters (e.g., the recruiter 104a and the recruiter 104b). Further, each of the recruiters 104a, 104b includes one recruiter employee (e.g., the recruiter employee 118a and the recruiter employee 118b, respectively). In other examples, there may be more (e.g., 3, 4, 5, etc.) or less (e.g., 1) recruiters and/or one or more of the recruiters may include a plurality of recruiter employees that interact with the employment website 108.

In the illustrated example, the recruiters 104a, 104b provide respective bid information 122a, 122b. Each of the bid information 122a, 122b includes one or more bids for candidates. For example, each of the bids for candidates of the bid information 122a and/or the bid information 122b includes recruiter identification information (e.g., a company name, an ID number associated with the recruiter), one or more keywords (e.g., included in a keyword "bag" of the employment website 108), a bid value (e.g., a monetary value), and a bid quantity (e.g., a number of occurrences that the bid is to be utilized). For example, a bid for candidates of the bid information 122a includes recruiter identification of the recruiter 104a (e.g., "ABC Co." and/or "Recruiter No. 123456"), one or more keywords selected by the recruiter 104a (e.g., "software engineer," "Chicago," "5-10 Years Experience," etc.), a bid value (e.g., $5.25), and a bid quantity (e.g., 25 bids). The bids for candidates are utilized by the employment website 108 and/or the employment website entity 100 to identify one or more recruiters (e.g., the recruiter 104a) that are to receive candidate information (e.g., the candidate information 110a) of a candidate (e.g., the candidate 102). As illustrated in FIG. 1, the bid information 122a of the recruiter 104a, the bid information 122b of the recruiter 104b, and/or bid information of any other recruiter is sent to a network 124 (e.g., via a wired and/or a wireless connection). Further, the employment website entity 100 retrieves bid information 122 from the network 124 (e.g., via a wired and/or a wireless connection). In the illustrated example, the bid information 122 includes the bid information 122a of the recruiter 104a, the bid information 122b of the recruiter 104b, and/or bid information of any other recruiter.

The employment website entity 100 also sends candidate information 126 to the network 124 (e.g., via a wired and/or a wireless connection). In the illustrated example, the candidate information 126 is associated with the candidate 102 and includes at least a portion of the candidate information 110a provided by the candidate 102. For example, the candidate information 126 includes contact information, work experience information, education information, certificate and/or license information, and/or salary information provided by the candidate 102. In the illustrated example, candidate information 126a of the candidate information 126 is provided to the recruiter 104a via the employment website 108 (e.g., via a wired and/or a wireless connection). The recruiter 104a may utilize the candidate information 126a to evaluate and/or contact the candidate 102.

As illustrated in FIG. 1, the employment website entity 100 includes a recruiter manager 128, a database operator 130, a database 132, a candidate manager 134, and a recruiter-candidate comparator 136. In the illustrated example, the recruiter manager 128 retrieves information (e.g., the bid information 122) from, processes information (e.g., transforms keywords of bids for candidates, identifies other terms associated with keywords), and provides information (e.g., the candidate information 126) to the recruiters 104a, 104b. The database 132 stores data associated with bids for candidates of the recruiters 104a, 104b. Further, the database operator 130 adds data to, removes data from, modifies data within, and/or otherwise organizes the data stored in the database 132. The candidate manager 134 retrieves information (e.g., the candidate information 110, the keyword information 112) from, processes information (e.g., transforms keywords, identifies other terms associated with keywords), and provides information to the candidate 102 via the employment website 108.

In operation, the recruiter manager 128 collects the bids for candidates from the network 124 that the recruiters 104a, 104b submit via the employment website 108. In some examples, one or more of the recruiters 104a, 104b is associated with a plurality of bids for candidates. In such examples, at least one of those bids for candidates includes multiple keywords, and each of those bids for candidates includes a different keyword combination than the other of those bids for candidates. Further, in some examples, the recruiter manager 128 transforms the keyword(s) of the bids for candidates to enable or facilitate the recruiter-candidate comparator 136 in identifying candidates for the recruiters 104a, 104b. For example, if the bid for candidates includes a first keyword of "engineering" and a second keyword of "software," the recruiter manager 128 transforms the first keyword to "engineer." The recruiter manager 128 may utilize a semantic search application program interface (API) to transform the keywords of bids for candidates of the recruiters 104a, 104b. Additionally or alternatively, the recruiter manager 128 identifies one or more terms associated with the keyword(s) of the bids for candidates of the recruiters 104a, 104b and incorporates those term(s) into the bids for candidates. For example, recruiter manager 128 identifies "software developer" based on the transformed first keyword of "engineer" and the second keyword of "software."

The database operator 130 adds the bids for candidates that are received by the recruiter manager 128 to the database 132. As illustrated in FIG. 1, each entry of the database 132 is associated with a bid for candidates. Further, the entries in the database 132 include a recruiter (e.g., "ABC Co." and/or "Recruiter No. 123456"), keyword(s) and/or associated terms (e.g., "software," "engineer," "software developer," "Chicago," "5-10 Years Experience," etc.), a bid value (e.g., $5.25), and a bid quantity (e.g., 25 bids) of the candidate. In some examples, the database operator 130 removes an entry from the database 132 based on a predetermined time limit associated with the bid. For example, the employment website entity 100 and/or the recruiters 104a, 104b may identify a predetermined duration of time (e.g., 3 months) at which a submitted bid is removed from the database 132.

Further, the candidate manager 134 retrieves keyword(s) from the network 114 that the candidate 102 has provided the employment website 108 during the session of the candidate 102 on the employment website 108. For example, the candidate manager 134 retrieves a first keyword (e.g., "engineering") and a second keyword (e.g., "software") provided by the candidate 102. In some examples, the candidate manager 134 transforms (e.g., in real time during the session of the candidate 102 on the employment website 108) the keyword(s) provided by the candidate 102 to facilitate the recruiter-candidate comparator 136 in identifying matching keyword(s) in the database 132. The recruiter manager 128 may utilize a semantic search API to transform the keywords provided by the candidate. For example, the candidate manager 134 transforms the first keyword of "engineering" to "engineer." Additionally or alternatively, the candidate manager 134 identifies term(s) associated with the keyword(s) (e.g., in real time during the session of the candidate 102 on the employment website 108) to facilitate the recruiter-candidate comparator 136 in identifying matching keyword(s) in the database 132. For example, the candidate manager 134 identifies the term "software developer" as being associated with the transformed first keyword of "engineer" and the second keyword of "software." Further, in some examples, the candidate manager 134 tags, maps, attaches, and/or otherwise associates the candidate profile of the candidate 102 with the keyword(s) provided by the candidate 102 and/or the associated term(s). By associating the keyword(s) and/or associated term(s) with the candidate profile of the candidate 102, the candidate manager 134 enables the recruiters 104a, 104b to identify or discover the candidate 102 when utilizing a search tool of the employment website 108 to find potential candidates for open positions. For example, the candidate manager 134 may rank candidates based on the keyword(s) and/or associated term(s) to facilitate the recruiters 104a, 104b in identifying or discovering the candidate 102.

Subsequently, the recruiter-candidate comparator 136 queries the database 132 to identify whether the database 132 include a bid for candidates that include the keyword(s) and/or associated term(s) provided by the candidate 102. For example, the recruiter-candidate comparator 136 determines whether a bid for candidates of the database 132 includes the keyword(s) (e.g., the "software" and "engineer") and/or the associated term(s) ("software developer"). In response to determining that the database 132 includes a bid for candidates having the keyword(s) and/or the associated term(s), the recruiter-candidate comparator 136 identifies the bids for candidate(s) that include the keyword(s) and/or the associated term(s). In some examples, in response to determining that the database 132 includes no bids for candidates having the keyword(s) and/or the associated term(s), the recruiter-candidate comparator 136 prompts one or more recruiters (e.g., the recruiters 104a, 104b) to bid for the candidate 102 based on the keyword(s) and/or the associated term(s) (e.g., in real time during the session of the candidate 102 on the employment website 108). For example, the recruiter-candidate comparator 136 prompts the recruiters 104a, 104b to bid for a candidate (e.g., the candidate 102) that has entered the searched terms of "software" and "engineering" into the employment website 108.

In some examples, the recruiter-candidate comparator 136 queries the database 132 and/or identifies the bids for candidate(s) in real time (e.g., via real-time computing) during the session of the candidate 102 on the employment website 108 upon the candidate manager 134 retrieving the keyword(s) from the candidate 102. Additionally or alternatively, the candidate manager 134 may store the keyword(s) and/or the associated term(s) of the candidate 102 in the database 132 and/or another database (e.g., a second database) associated with the candidate manager 134 to enable the recruiter-candidate comparator 136 to query the database 132 of the bids for candidates at a later time. For example, the recruiter-candidate comparator 136 may access the database to retrieve the keyword(s) and/or the associated term(s) of the candidate 102 upon receiving a bid for candidates from one of the recruiters 104a, 104b.

In some examples, the recruiter-candidate comparator 136 determines not to query the database 132 for bids for candidates if the keyword(s) and/or the associated term(s) of the candidate 102 do not correspond with the candidate profile and/or resume of the candidate 102. For example, the recruiter-candidate comparator 136 determines not to query the database 132 if the candidate 102 provides the search terms of "software" and "engineering" and the candidate profile indicates that the candidate 102 has no experience in the field of software engineering. To determine whether the keyword(s) correspond to the candidate profile, the recruiter-candidate comparator 136 determines (e.g., in real time during the session of the candidate 102 on the employment website 108) whether one or more of the keyword(s) provided by the candidate 102 and/or any associated term(s) are included in the candidate profile of the candidate 102.

Additionally or alternatively, the recruiter-candidate comparator 136 determines whether the keyword(s) and/or associated term(s) of the identified bids for candidate(s) correspond to the candidate profile and/or a resume of the candidate 102 to prevent the recruiter 104a from bidding on candidate information of unqualified candidates. For example, to determine whether the keyword(s) of the bids for candidates correspond to the candidate profile, the recruiter-candidate comparator 136 determines (e.g., in real time during the session of the candidate 102 on the employment website 108) whether one or more of the keyword(s) and/or associated term(s) are included in the candidate profile of the corresponding candidate (e.g., the candidate 102).

Upon identifying the bids for candidate(s) that include the keyword(s) of the candidate 102 and/or the associated term(s), the recruiter-candidate comparator 136 retrieves those bids for candidate(s) from the database 132 (e.g., in real time during the session of the candidate 102 on the employment website 108). Further, based on those bids for candidate(s), the recruiter-candidate comparator 136 determines a recruiter list (e.g., in real time during the session of the candidate 102 on the employment website 108). That is, the recruiter-candidate comparator 136 forms the recruiter list to include at least one recruiter (e.g., the recruiter 104a) of the bids for candidate(s) that include the keyword(s) of the candidate 102 and/or the associated term(s). Further, upon the recruiter-candidate comparator 136 adding a recruiter (e.g., the recruiter 104a) to the recruiter list, the database operator 130 reduces the bid quantity of the corresponding bids for candidates of the database 132 (e.g., by a quantity of "1") to reflect that the bids for candidates has been accepted by the employment website entity 100.

Further, the recruiter-candidate comparator 136 of the illustrated example utilizes a bidding system to determine which recruiters of the identified bids for candidate(s) are included in the recruiter list. For example, to determine the recruiter list, the recruiter-candidate comparator 136 compares (e.g., in real time during the session of the candidate 102 on the employment website 108) bid values of the bids for candidate(s) of the database 132 that include the keyword(s) and/or associated term(s) and includes the bids for candidate(s) in the recruiter list that have the highest bid value(s). For example, the recruiter-candidate comparator 136 selects a bid for candidates of the recruiter 104a that has a bid value (e.g., $4.75) instead of a bid for candidates of the recruiter 104b having a lower bid value (e.g., $3.80).

In some examples, the number of recruiters that the recruiter-candidate comparator 136 selects is limited by a predetermined threshold. The employment website entity 100 may select a threshold number of recruiters (e.g., 10 recruiters) to reduce a number recruiters that contact the candidate 102 at one time. For example, if the number of bids for candidates identified by the recruiter-candidate comparator 136 exceeds the predetermined threshold, the recruiter-candidate comparator 136 selects a number of recruiters equaling the predetermined threshold to be included in the recruiter list. In such examples in which a bidding system is utilized, the recruiter-candidate comparator 136 selects those recruiters associated with the highest bid values of the corresponding bids for candidates.

Subsequently, the recruiter manager 128 distributes the candidate information 126 of the candidate 102 to the recruiters of the recruiter list. For example, the recruiter manager 128 distributes the candidate information 126 in real time during the session of the candidate 102 on the employment website 108 to facilitate communication with the candidate 102. In the illustrated example, the recruiter manager 128 provides the candidate information 126*a* of the candidate 102 to the recruiter 104*a* via the employment website 108. The recruiter manager 128 may distribute the candidate information 126 to the recruiters of the recruiter list without receiving job postings from the recruiters of the recruiter list and/or without the candidate 102 selecting the recruiters of the recruiter list via the employment website 108. Further, upon receiving the candidate information 126*a* of the candidate 102, the employment website 108 enables the recruiter 104*a* to contact the candidate 102 via an email address, a phone number, and/or a street address included in the candidate information 126*a* and/or via an instant messaging system of the employment website 108 (e.g., during the session of the candidate 102 in which the candidate 102 provided the keyword(s)).

Figure 2:
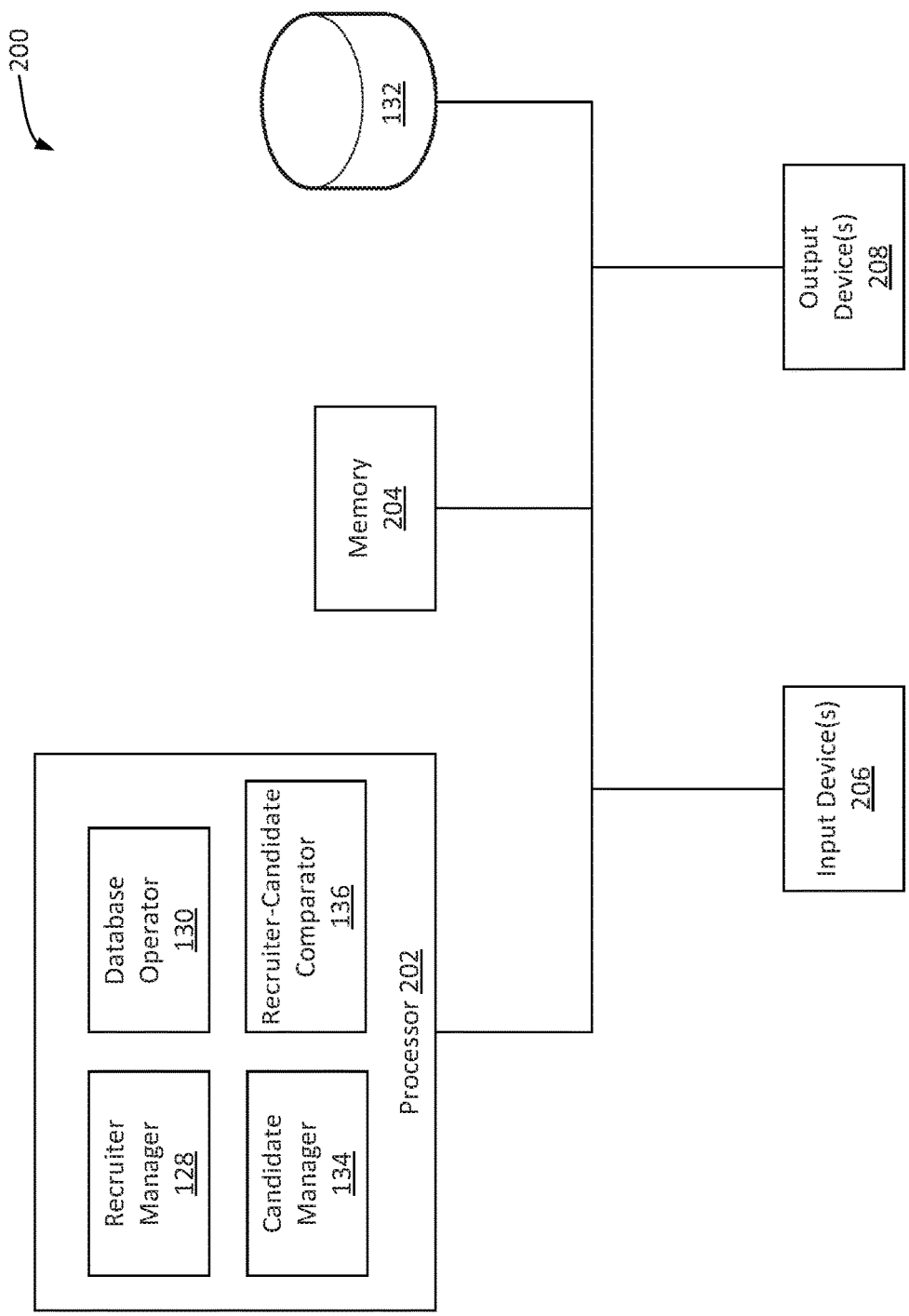
FIG. 2 is a block diagram of electronic components of the employment website entity of FIG. 1.

FIG. 2 is a block diagram of electronic components 200 of the employment website entity 100. As illustrated in FIG. 2, the electronic components 200 include a microcontroller unit, controller, processor 202. Further, the electronic components 200 include memory 204, the database 132, input device(s) 206, and output device(s) 208.

In the illustrated example, the processor 202 is structured to include the recruiter manager 128, the database operator 130, the candidate manager 134, and the recruiter-candidate comparator 136. The processor 202 of the illustrated example is any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). In some examples, the memory 204 is volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). Further, in some examples, the memory 204 includes multiple kinds of memory, particularly volatile memory and non-volatile memory.

The memory 204 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 204, the computer readable medium, and/or within the processor 202 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

In the illustrated example, the input device(s) 206 enable a user, such as an information technician of the employment website entity 100, to provide instructions, commands, and/or data to the processor 202. Examples of the input device(s) 206 include one or more of a button, a control knob, an instrument panel, a touch screen, a touchpad, a keyboard, a mouse, a speech recognition system, etc.

The output device(s) 208 of the illustrated example display output information and/or data of the processor 202 to a user, such as an information technician of the employment website entity 100. Examples of the output device(s) 208 include a liquid crystal display (LCD), an organic light emitting diode (OLED) display, a flat panel display, a solid state display, and/or any other device that visually presents information to a user. Additionally or alternatively, the output device(s) 208 may include one or more speakers and/or any other device(s) that provide audio signals for a user. Further, the output device(s) 208 may provide other types of output information, such as haptic signals.

Figure 3:
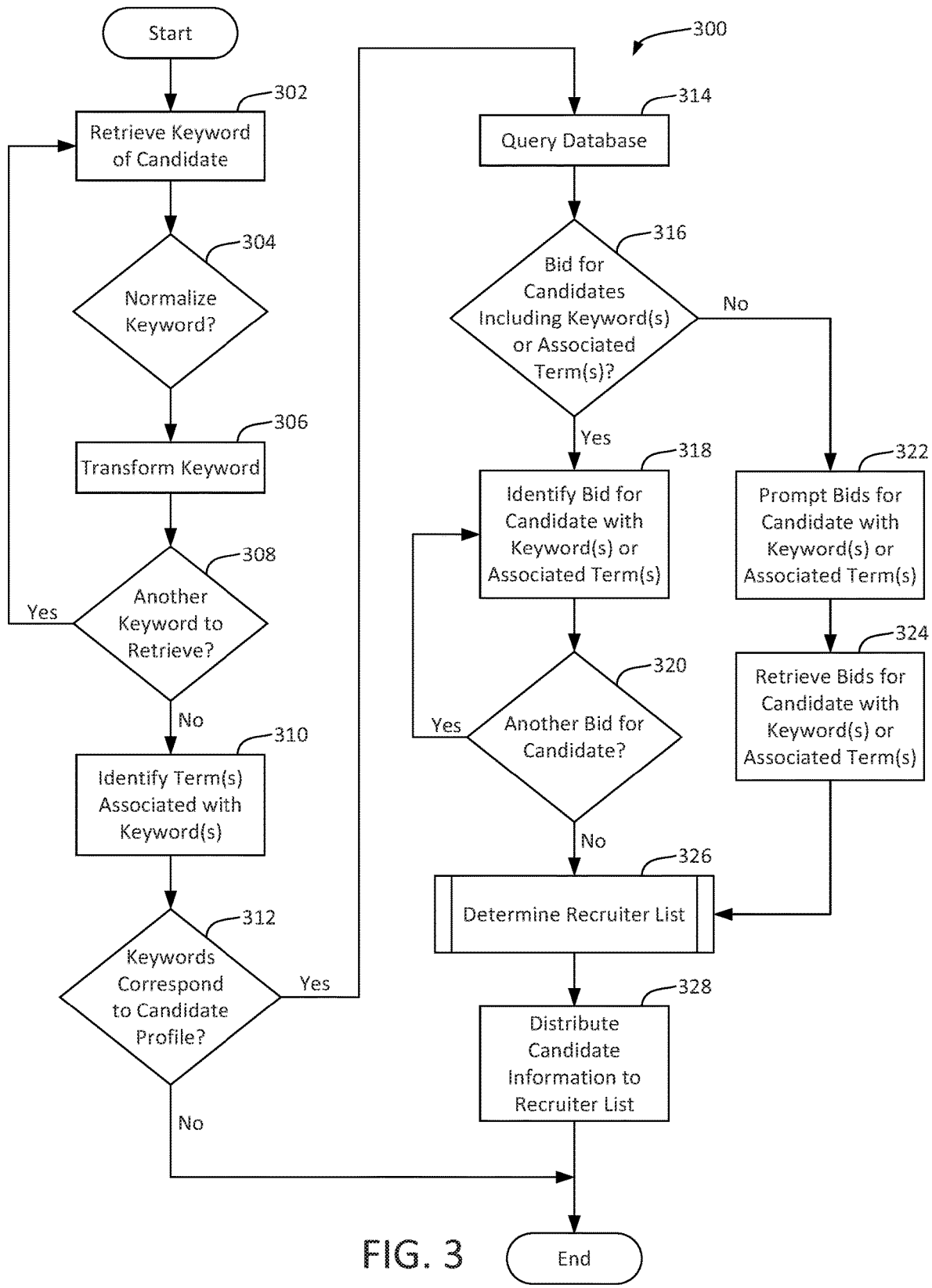
FIG. 3 is a flowchart of an example method for the employment website entity of FIG. 1 to distribute candidate information of a candidate to a recruiter list in accordance with the teachings herein.

FIG. 3 is a flowchart of an example method 300 for an employment website entity to distribute candidate information of a candidate to a recruiter list. The flowchart of FIG. 300 is representative of machine readable instructions that are stored in memory (such as the memory 204 of FIG. 2) and include one or more programs which, when executed by a processor (such as the processor 202 of FIG. 2), cause the employment website entity 100 to implement the example recruiter manager 128, the example candidate manager 134, and/or the example recruiter-candidate comparator 136 of FIGS. 1-2. While the example program is described with reference to the flowchart illustrated in FIG. 3, many other methods of implementing the example recruiter manager 128, the example candidate manager 134, and/or the example recruiter-candidate comparator 136 may alternatively be used. For example, the order of execution of the blocks may be rearranged, changed, eliminated, and/or combined to perform the method 300. Further, because the method 300 is disclosed in connection with the components of FIGS. 1-2, some functions of those components will not be described in detail below.

Initially, at block 302, the candidate manager 134 retrieves a first keyword provided by the candidate 102 via the employment website 108 during a session on the employment website 108. For example, the keyword is included in the keyword information 112 that the candidate manager 134 retrieves from the network 114 via a wired and/or a wireless communication. At block 304, the candidate manager 134 determines whether the keyword is to be transformed (e.g., in real time during the session). In response to determining that the keyword is to be transformed, the method 300 proceeds to block 306 at which the candidate manager 134 transforms the keyword (e.g., in real time during the session). For example, if the retrieved keyword is "engineering," the candidate manager 134 transforms the keyword to "engineer." Upon determining that the keyword is not to be transformed at block 304 or upon transforming the keyword at block 306, the candidate manager 134 determines whether there is another keyword to receive (block 308). In response to determining that there is another keyword, blocks 302, 304, 306, 308. For example, blocks 302, 304, 306, 308 are repeated to retrieve a second keyword (e.g., "software"). Blocks 302, 304, 306, 308 are repeated until all keywords provided by the candidate 102 are retrieved by the candidate manager 134. Upon retrieving the keywords provided by the candidate 102, the candidate manager 134 identifies (e.g., in real time during the session) any term(s) associated with one or more of the keywords (block 310). For example, the candidate manager 134 identifies an associated term, "software developer," based on the transformed first keyword, "engineer," and the second keyword, "software."

At block 312, the recruiter-candidate comparator 136 determines whether the keyword(s) provided by the candidate 102 correspond to a candidate profile of the candidate 102. For example, to determine whether the keyword(s) correspond to the candidate profile, the recruiter-candidate comparator 136 determines (e.g., in real time during the session) whether one or more of the keyword(s) and/or associated terms are included in the candidate profile of the candidate 102. Additionally or alternatively, the recruiter-candidate comparator 136 compares the keyword(s) and/or associated terms correspond to a resume of the candidate 102. In response to the recruiter-candidate comparator 136 determining that the keyword(s) do not correspond to the candidate profile, the method 300 ends.

In response to the recruiter-candidate comparator 136 determining that the keyword(s) corresponds to the candidate profile, the method 300 proceeds to block 314 at which the recruiter-candidate comparator 136 queries the database 132 (e.g., in real time during the session). At block 316, the recruiter-candidate comparator 136 determines (e.g., in real time during the session) whether a bid for candidates of the database 132 includes the keyword(s) (e.g., the "software" and "engineer") and/or the associated term(s) ("software developer").

In response to the recruiter-candidate comparator 136 determining that the database 132 includes a bid for candidates that includes the keyword(s) and/or the associated term(s), the method 300 proceeds to block 318. At block 318, the recruiter-candidate comparator 136 identifies (e.g., in real time during the session) a bid for candidates that includes the keyword(s) and/or the associated term(s). At block 318, the recruiter-candidate comparator 136 determines whether there is another bids for candidates that includes the keyword(s) and/or the associated term(s). If there is another bids for candidates, blocks 318, 320 are repeated until no other bids for candidates are identified.

Otherwise, in response to the recruiter-candidate comparator 136 determining at block 316 that the database 132 includes no bids for candidates that include the keyword(s) and/or the associated term(s), the method 300 proceeds to block 322. At block 322, the recruiter manager 128 prompts (e.g., in real time during the session) the recruiters 104a, 104b to bid on a candidate (e.g., the candidate 102) based on the keyword(s) provided by the candidate 102. At block 324, the recruiter manager 128 retrieves the bids for candidates from one or more recruiters (e.g., the recruiters 104a, 104b) that were prompted based on the keyword(s) of the candidate 102.

At block 326, the recruiter-candidate comparator 136 determines (e.g., in real time during the session) a recruiter list based on the one or more bids for candidates that includes the keyword(s) and/or the associated term(s). For example, the recruiter list determined by the recruiter-candidate comparator 136 includes one or more recruiters (e.g., the recruiter 104a) that have submitted a bid for candidates for the keyword(s) and/or the associated term(s). Further, at block 328, the recruiter manager 128 distributes (e.g., in real time during the session) the candidate information 126 of the candidate 102 to the recruiter(s) of the recruiter list. For example, the recruiter manager 128 provides the candidate information 126a (e.g., including contact information and job qualifications) of the candidate 102 to the recruiter 104a to facilitate communication with the candidate 102 via the employment website 108.

Figure 4:
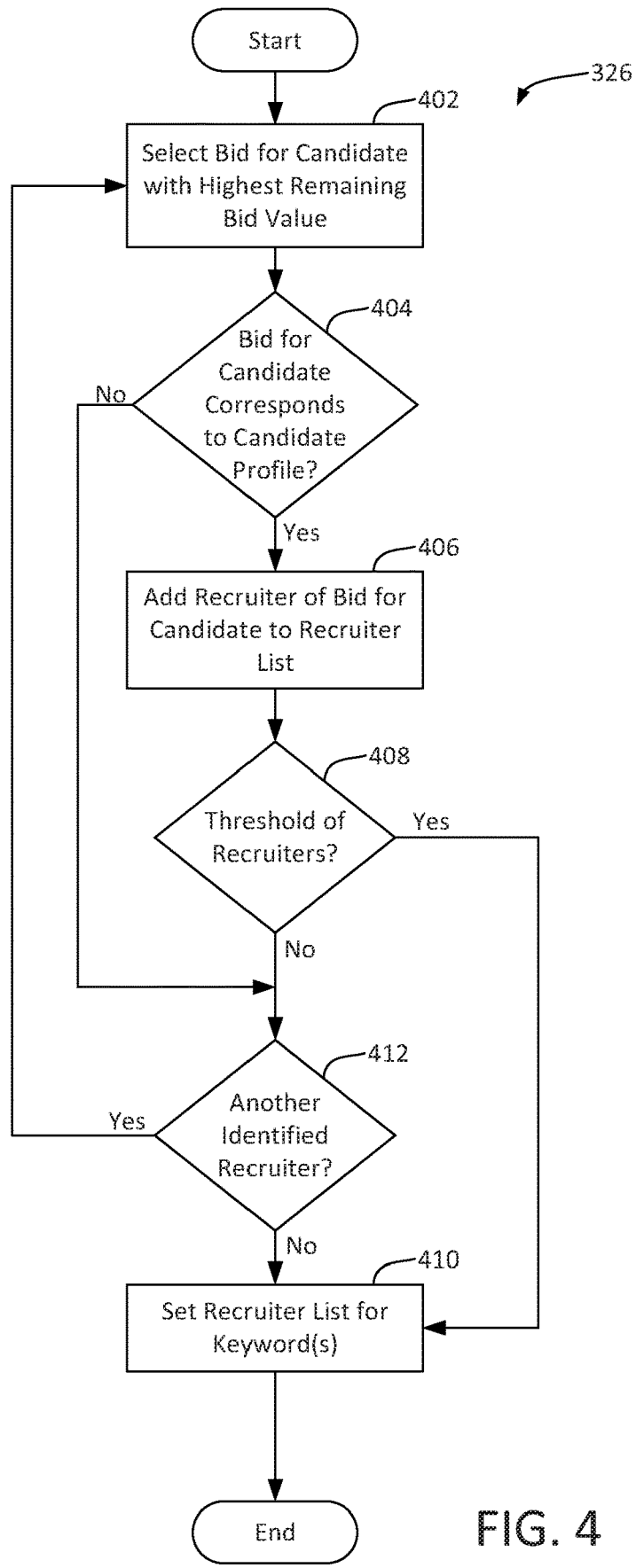
FIG. 4 is a flowchart of an example method to determine the recruiter list of FIG. 3.

FIG. 4 is a flowchart of an example method to implement block 326 of FIG. 3 to determine a recruiter list. The flowchart of FIG. 4 is representative of machine readable instructions that are stored in memory (such as the memory 204 of FIG. 2) and include one or more programs which, when executed by a processor (such as the processor 202 of FIG. 2), cause the employment website entity 100 to implement the example recruiter-candidate comparator 136 of FIGS. 1-2. While the example program is described with reference to the flowchart illustrated in FIG. 4, many other methods of implementing the example recruiter-candidate comparator 136 may alternatively be used. For example, the order of execution of the blocks may be rearranged, changed, eliminated, and/or combined to perform the method to implement block 326 of FIG. 3. Further, because the method to implement block 326 is disclosed in connection with the components of FIGS. 1-2, some functions of those components will not be described in detail below.

Initially, at block 402, the recruiter-candidate comparator 136 selects the bids for candidates identified at block 318 of FIG. 3 that includes the highest remaining bid value of the bids for candidates identified at block 318. For example, the recruiter-candidate comparator 136 selects a bid for candidates of the recruiter 104a that has a bid value (e.g., $4.75) instead of a bid for candidates of the recruiter 104b having a lower bid value (e.g., $3.80).

At block 404, the recruiter-candidate comparator 136 determines whether the bids for candidates corresponds to the candidate profile of the candidate 102 to prevent the recruiter 104a from bidding on candidate information of unqualified candidates. For example, to determine whether the keyword(s) of the bids for candidates correspond to the candidate profile, the recruiter-candidate comparator 136 determines whether one or more of the keyword(s) and/or associated terms are included in the candidate profile of the corresponding candidate (e.g., the candidate 102). Additionally or alternatively, the recruiter-candidate comparator 136 compares the keyword(s) and/or associated terms correspond to a resume of the corresponding candidate.

In response to the recruiter-candidate comparator 136 determining that the keyword(s) of the bids for candidates corresponds to the candidate profile, the recruiter-candidate comparator 136 adds the recruiter (e.g., the recruiter 104a) of the selected bids for candidates to the recruiter list (block 406). Upon adding the recruiter to the recruiter list, the database operator 130 may reduce the bid quantity of the bids for candidates included in the database 132 (e.g., by a quantity of "1") to reflect that the bids for candidates has been accepted by the employment website entity 100. Further, at block 408, the recruiter-candidate comparator 136 determines whether the number of recruiters included in the recruiter list has reached and/or surpassed a predetermined threshold number of recruiters for the recruiter list. For example, the employment website entity 100 may select a threshold of recruiters (e.g., 10 recruiters). In response to determining that the threshold number of recruiters has been reached and/or surpassed, the recruiter-candidate comparator 136 sets the recruiter list for the keyword(s) provided by the candidate 102 (block 410).

Otherwise, if the recruiter-candidate comparator 136 determines at block 404 that the bids for candidates does not correspond to the candidate profile or determines at block 408 that the threshold number of recruiters has not been reached and/or surpassed, the recruiter-candidate comparator 136 determines whether there is another recruiter of the bids for candidates identified at block 318 of FIG. 3 (block 412). In response to determining that there is another recruiter, blocks 402, 404, 406, 408, 412 are repeated until no other recruiters of the bids for candidates identified at block 318 and/or until the predetermined threshold number of recruiters is reached and/or surpassed. For example, upon determining that there are no other recruiters at block 412, the recruiter-candidate comparator 136 sets the recruiter list at block 410.

Figure 5:
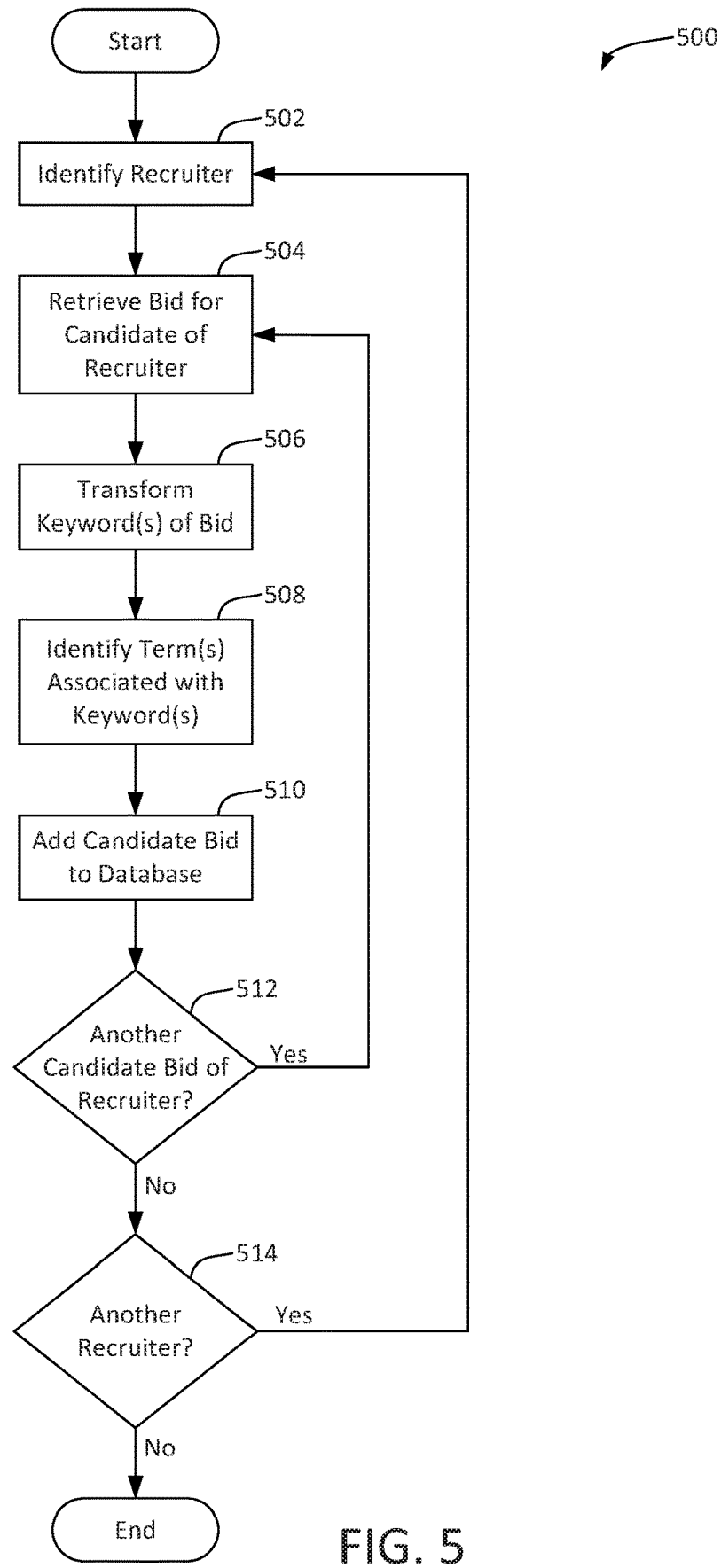
FIG. 5 is a flowchart of an example method to manage a database of bids for candidates for the employment website entity of FIG. 1.

FIG. 5 is a flowchart of an example method 500 to manage a database of bids for candidates for an employment website entity. The flowchart of FIG. 5 is representative of machine readable instructions that are stored in memory (such as the memory 204 of FIG. 2) and include one or more programs which, when executed by a processor (such as the processor 202 of FIG. 2), cause the employment website entity 100 to implement the example recruiter manager 128 and/or the example database operator 130 of FIGS. 1-2. While the example program is described with reference to the flowchart illustrated in FIG. 5, many other methods of implementing the example recruiter manager 128 and/or the example database operator 130 may alternatively be used. For example, the order of execution of the blocks may be rearranged, changed, eliminated, and/or combined to perform the method 500. Further, because the method 500 is disclosed in connection with the components of FIGS. 1-2, some functions of those components will not be described in detail below.

Initially, at block 502, the recruiter manager 128 identifies a recruiter. For example, the recruiter manager 128 identifies the recruiter 104a based on a name of the recruiter 104a (e.g., "ABC Co.") and/or an ID number associated with the recruiter 104a (e.g., "Recruiter No. 123456"). At block 504, the recruiter manager 128 retrieves a bid for candidates from the recruiter 104a. For example, the recruiter manager 128 collects the bid information 122a that includes the bids for candidates of the recruiter 104a from the network 124.

At block 506, the recruiter manager 128 transforms one or more keyword(s) of the bids for candidates of the recruiter 104a. For example, if the bids for candidates includes a first keyword of "software" and a second keyword of "engineering," the recruiter manager 128 transforms the second keyword to "engineer." At block 508, the recruiter manager 128 identifies any term(s) associated with the keyword(s) included in the bid for candidates. For example, recruiter manager 128 identifies "software developer" based on the first keyword of "software" and the transformed second keyword of "engineer." At block 510, the database operator 130 adds the bids for candidates to the database 132.

At block 512, the recruiter manager 128 determines whether there is another bids for candidates submitted by the recruiter 104a. In response to determining that there is another bids for candidates, block 502, 504, 506, 508, 510 are repeated until no other bids for candidates of the recruiter 104a are identified. Upon determining that there are no other bids for candidates of the recruiter, the recruiter manager 128 proceeds to block 514 at which the recruiter manager 128 determines whether there is another recruiter from which to collect bids for candidate(s). In response to determining that there is another recruiter (e.g., the recruiter 104b), blocks 502, 504, 506, 508, 510, 512 are repeated until no other recruiters are identified. In response to determining that there is not another recruiter, the method 500 ends.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A system for distributing information of employment candidates to recruiters, the system comprising:
one or more processors configured to:
retrieve a first keyword provided by a candidate during a session of the candidate on an employment website;
in response to retrieving the first keyword, query, in real time during the session, a database that includes bids for candidates, wherein each of the bids for candidates in the database includes a recruiter and a selected keyword selected by the recruiter;
in response to identifying that the selected keyword of at least one of the bids for candidates corresponds with the first keyword retrieved from the candidate, retrieve, in real time during the session, one or more of the bids for candidates that include the first keyword from the database;
determine a recruiter list to include at least one recruiter of the one or more bids for candidates that include the first keyword; and
distribute, in real time during the session of the candidate on the employment website, contact information of the candidate to the at least one recruiter of the recruiter list to identify the candidate for the at least one recruiter of the recruiter list and facilitate the at least one recruiter in initiating communication with the candidate during the session.

2. The system of claim 1, wherein a first recruiter is associated with a plurality of bids for candidates, and wherein at least one of the bids for candidates associated with the first recruiter includes multiple selected keywords, and wherein each of the bids for candidates associated with the first recruiter includes a different selected keyword combination than the other of the bids for candidates associated with the first recruiter.

3. The system of claim 1, wherein the one or more processors are configured to retrieve a second keyword provided by the candidate during the session on the employment website and determine the recruiter list in response to identifying that at least one of the bids for candidates includes selected keywords corresponding with the first keyword and the second keyword.

4. The system of claim 1, wherein the one or more processors are configured to transform the first keyword provided by the candidate to facilitate retrieving the one or more of the bids for candidates of the database that include the first keyword.

5. The system of claim 4, wherein the one or more processors are configured to:
identify a term associated with the first keyword; and
retrieve one or more of the bids for candidates from the database that include at least one of the first keyword and the term associated with the first keyword.

6. The system of claim 1, wherein the one or more processors are configured to determine the recruiter list in response to determining the first keyword corresponds to a profile of the candidate stored in a second database.

7. The system of claim 1, wherein the one or more processors are configured to distribute the candidate information of the candidate to the at least one recruiter of the recruiter list in response to determining the first keyword corresponds to a profile of the candidate.

8. The system of claim 1, wherein the one or more processors are configured to transform the selected keyword of each of the bids for candidates to facilitate retrieving the one or more of the bids for candidates of the database that include the first keyword.

9. The system of claim 8, wherein the one or more processors are configured to identify terms associated with the selected keywords of the bids for candidates and include the terms in the bids for candidates.

10. The system of claim 1, wherein each of the bids for candidates of the database includes a bid value, wherein, to determine the recruiter list, the one or more processors are configured to compare the bid values of the one or more bids for candidates that include the first keyword and include one or more recruiters corresponding with the highest of the bid values in the recruiter list.

11. The system of claim 1, wherein the one or more processors are configured to limit the recruiter list to include a number of recruiters associated with the bids that is less than or equal to a predetermined threshold.

12. The system of claim 1, wherein the one or more processors are configured to distribute the candidate information to the at least one recruiter of the recruiter list without receiving a job posting for the employment website from the at least one recruiter of the recruiter list and without the candidate selecting the recruiter list via the employment website.

13. The system of claim 1, wherein the one or more processors are configured to, in response to identifying that none of the bids for candidates of the database includes the first keyword, prompt one or more recruiters to bid for the candidate based on the first keyword in real time during the session of the candidate on the employment website.

14. A method for distributing information of employment candidates to recruiters, the method comprising:
retrieving, via one or more processors, a first keyword provided by a candidate during a session of the candidate on an employment website;
in response to retrieving the first keyword, querying, in real time during the session, a database that includes bids for candidates, wherein each of the bids for candidates in the database includes a recruiter and a selected keyword selected by the recruiter;
in response to identifying that the selected keyword of at least one of the bids for candidates corresponds with the first keyword retrieved from the candidate, retrieving one or more of the bids for candidates that include the first keyword from the database;
determining a recruiter list to include at least one recruiter of the one or more bids for candidates that include the first keyword; and
distributing, in real time during the session of the candidate on the employment website, contact information of the candidate to the at least one recruiter of the recruiter list to identify the candidate for the at least one recruiter of the recruiter list and facilitate the at least one recruiter in initiating communication with the candidate during the session.

15. The method of claim 14, further including:
retrieving a second keyword provided by the candidate during the session on the employment website; and
determining, in response to identifying that at least one of the bids for candidates includes the first keyword and the second keyword, the recruiter list to include one or more recruiters associated with the one or more bids for candidates of the database that include selected keywords corresponding with the first keyword and the second keyword.

16. The method of claim 14, further including transforming the first keyword provided by the candidate to facilitate the retrieval of the one or more of the bids for candidates of the database that include the first keyword.

17. The method of claim 14, further including:
comparing bid values of the one or more bids for candidates that include the first keyword, each of the bids for candidates of the database includes a bid value; and
determining the recruiter list to include one or more recruiters associated with the one or more bids for candidates having the highest one or more bid values.

18. A tangible computer readable medium including instructions which, when executed, cause a machine to:
retrieve a first keyword provided by a candidate during a session of the candidate on an employment website;
in response to retrieving the first keyword, query, in real time during the session, a database that includes bids for candidates, wherein each of the bids for candidates in the database includes a recruiter and a selected keyword selected by the recruiter;
retrieve, in response to identifying that the selected keyword of at least one of the bids for candidates corresponds with the first keyword retrieved from the candidate, one or more of the bids for candidates that include the first keyword from the database;
determine a recruiter list to include at least one recruiter of the one or more bids for candidates that include the first keyword; and
distribute, in real time during the session of the candidate on the employment website, contact information of the candidate to the at least one recruiter of the recruiter list to identify the candidate for the at least one recruiter of the recruiter list and facilitate the at least one recruiter in initiating communication with the candidate during the session.

19. The system of claim 1, wherein, upon distributing the candidate information of the candidate to the at least one recruiter of the recruiter list, the one or more processors are configured to transmit an instant message, through the employment website, from one of the at least one recruiter included in the recruiter list to the candidate during the session.

20. The system of claim 1, wherein the one or more processors are configured to distribute qualification information of the candidate with the contact information to the at least one recruiter of the recruiter list to facilitate the at least one recruiter in determining whether to initiate communication with the candidate during the session.

* * * * *